US012625619B2

(12) United States Patent
Yeh

(10) Patent No.: US 12,625,619 B2
(45) Date of Patent: May 12, 2026

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventor: Yen Chen Yeh, Hsinchu City (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 18/923,689

(22) Filed: Oct. 23, 2024

(65) Prior Publication Data

US 2026/0072597 A1     Mar. 12, 2026

(30) Foreign Application Priority Data

Sep. 9, 2024   (TW) ................................. 113134092

(51) Int. Cl.
*G06F 12/00* (2006.01)
*G06F 3/06* (2006.01)
(52) U.S. Cl.
CPC ............ *G06F 3/0619* (2013.01); *G06F 3/065* (2013.01); *G06F 3/0679* (2013.01)
(58) Field of Classification Search
None
See application file for complete search history.

(56) References Cited

U.S. PATENT DOCUMENTS

2021/0397375 A1* 12/2021 Kuo ...................... G06F 3/0652

FOREIGN PATENT DOCUMENTS

TW          I741870          10/2021

OTHER PUBLICATIONS

"Office Action of Taiwan Counterpart Application", issued on Jan. 23, 2025, p. 1-p. 5.

* cited by examiner

*Primary Examiner* — Daniel D Tsui
(74) *Attorney, Agent, or Firm* — JCIPRNET

(57) ABSTRACT

A memory management method is provided for a rewritable non-volatile memory module. The method includes: initiating a data merging operation; selecting a source physical unit and a target physical unit from the rewritable non-volatile memory module to perform the data merging operation; determining whether to create a backup table corresponding to a logical-to-physical mapping table; if it is determined to create the backup table, copying first data located at a first physical address in the source physical unit to a second physical address in the target physical unit, and recording the second physical address in the backup table; and determining whether to update the second physical address to the logical-to-physical mapping table based on information in the backup table.

24 Claims, 12 Drawing Sheets

| Logical address | Physical address |
|:---:|:---:|
| L(0) | P(0) |
| L(1) | P(1) |
| L(2) | P(2) |
| L(3) | P(3) |

910

Backup

| Logical address | Physical address | Merging physical address |
|:---:|:---:|:---:|
| L(0) | P(0) | |
| L(1) | P(1) | |
| L(2) | P(2) | |
| L(3) | P(3) | |

920

| Logical address | Physical address | Merging physical address | |
|---|---|---|---|
| L(0) | P(0) | | 920 |
| L(1) | P(1) | P(GC) | |
| L(2) | P(2) | | |
| L(3) | P(3) | | |

1510

| Physical address | Logical address |
|---|---|
| P(GC−2) |  |
| P(GC−1) |  |
| P(GC) | L(1) |
| P(GC+1) |  |

910

| Logical address | Physical address |
|---|---|
| L(0) | P(0) |
| L(1) | P(1) |
| L(2) | P(2) |
| L(3) | P(3) |

Update

910−3

| Logical address | Physical address |
|---|---|
| L(0) | P(0) |
| L(1) | P(GC) |
| L(2) | P(2) |
| L(3) | P(3) |

FIG. 15

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 113134092, filed on Sep. 9, 2024. The entirety of the above-mentioned patent application is hereby incorporated by reference herein and made a part of this specification.

BACKGROUND

Technical Field

The disclosure relates to a memory management method, and particularly relates to a method, a memory storage device, and a memory control circuit unit for updating a logical-to-physical mapping table after a data merging operation.

Description of Related Art

Portable electronic devices such as mobile phones and notebook computers have grown rapidly in recent years, resulting in a rapid increase in consumer demand for storage media. Since rewritable non-volatile memory modules (such as flash memory) have the characteristics of non-volatile data, power saving, small size, and no mechanical structure, it is very suitable to be built into various portable electronic devices as exemplified above.

The controller of the rewritable non-volatile memory module may establish a logical-to-physical mapping table to manage the mapping relationships between logical addresses and physical addresses. When the host system writes data, the logical-to-physical mapping table is updated to reflect the new mapping relationship. In addition, the controller may also create a physical-to-logical mapping table. When transferring valid data, the mapping relationship will first be recorded in the physical-to-logical mapping table, and then the mapping relationship will be updated to the logical-to-physical mapping table. However, if valid data is transferred while the host system is writing data, it may not be possible to determine that those mapping relationships are correct.

SUMMARY

In order to solve the above problems, embodiments of the disclosure propose a memory management method, a memory storage device, and a memory control circuit unit, wherein a backup table of a logical-to-physical mapping table will be established. During a data merging operation, a mapping relationship will be recorded in the backup table first, and then it will be determined whether to update the logical-to-physical mapping table, so as to ensure that the correct mapping relationship is updated.

Embodiments of the disclosure provide a memory management method for a rewritable non-volatile memory module, wherein the rewritable non-volatile memory module includes a plurality of physical units. The memory management method includes: initiating a data merging operation; selecting a source physical unit and a target physical unit from the rewritable non-volatile memory module to perform the data merging operation; determining whether to create a backup table corresponding to a logical-to-physical mapping table, wherein the logical-to-physical mapping table contains mapping relationships between a plurality of logical addresses and a plurality of physical addresses; if it is determined to create the backup table, copying first data located at a first physical address in the source physical unit to a second physical address in the target physical unit, and recording the second physical address in the backup table; and determining whether to update the second physical address to the logical-to-physical mapping table based on information in the backup table.

In an embodiment, the backup table also records the first physical address and a first logical address mapped to the first physical address. The step of determining whether to update the second physical address to the logical-to-physical mapping table according to the information in the backup table includes: after completing the data merging operation, obtaining a third physical address mapped by the first logical address from the logical-to-physical mapping table; and determining whether to update the second physical address to the logical-to-physical mapping table according to a comparison result between the first physical address and the third physical address.

In an embodiment, the step of determining whether to update the second physical address to the logical-to-physical mapping table according to the comparison result between the first physical address and the third physical address includes: if the third physical address is located in the source physical unit and the third physical address is greater than the first physical address, not updating the second physical address to the logical-to-physical mapping table.

In an embodiment, the step of determining whether to update the second physical address to the logical-to-physical mapping table according to the comparison result between the first physical address and the third physical address also includes: if the third physical address is located in the source physical unit and the third physical address is less than or equal to the first physical address, updating the second physical address to the logical-to-physical mapping table, so that the first logical address maps to the second physical address.

In an embodiment, the memory management method further includes: if the third physical address is not located in the source physical unit, not updating the second physical address to the logical-to-physical mapping table.

In an embodiment, the memory management method further includes: writing second data from a host system to the first physical unit, wherein the step of determining whether to create the backup table corresponding to the logical-to-physical mapping table includes: if the source physical unit is the same as the first physical unit, determining to create the backup table; otherwise, not creating the backup table.

In an embodiment, the step of determining whether to create the backup table corresponding to the logical-to-physical mapping table includes: if the source physical unit is an active physical unit or the source physical unit has not been closed, determining to create the backup table.

In an embodiment, the step of determining whether to create the backup table corresponding to the logical-to-physical mapping table includes: if the source physical unit has a corresponding physical-to-logical mapping table, determining not to create the backup table.

In an embodiment, the logical-to-physical mapping table records the first logical address mapped to the first physical address. The memory management method further includes: if it is determined not to create the backup table, copying the first data located at the first physical address in the source physical unit to the second physical address in the target physical unit, and recording that the second physical address is mapped to the first logical address in the physical-to-logical mapping table; and after performing the data merging operation, updating the logical-to-physical mapping table according to the physical-to-logical mapping table such that the first logical address is mapped to the second physical address in the logical-to-physical mapping table.

From another perspective, embodiments of the disclosure provide a memory storage device, including: a connection interface unit configured to be coupled to a host system; a rewritable non-volatile memory module including a plurality of physical units; and a memory control circuit unit coupled to the connection interface unit and the rewritable non-volatile memory module. The memory control circuit unit is configured to perform a plurality of steps: initiating a data merging operation; selecting a source physical unit and a target physical unit from the rewritable non-volatile memory module to perform the data merging operation; determining whether to create a backup table corresponding to a logical-to-physical mapping table, wherein the logical-to-physical mapping table contains mapping relationships between a plurality of logical addresses and a plurality of physical addresses; if it is determined to create the backup table, copying first data located at a first physical address in the source physical unit to a second physical address in the target physical unit, and recording the second physical address in the backup table; and determining whether to update the second physical address to the logical-to-physical mapping table based on information in the backup table.

From another perspective, embodiments of the disclosure provide a memory control circuit unit for controlling a rewritable non-volatile memory module. The rewritable non-volatile memory module includes a plurality of physical units. The memory control circuit unit includes: a host interface configured to be coupled to a host system; a memory interface configured to be coupled to the rewritable non-volatile memory module; and a memory management circuit configured to be coupled to the host interface and the memory interface. The memory management circuit is configured to perform a plurality of steps: initiating a data merging operation; selecting a source physical unit and a target physical unit from the rewritable non-volatile memory module to perform the data merging operation; determining whether to create a backup table corresponding to a logical-to-physical mapping table, wherein the logical-to-physical mapping table contains mapping relationships between a plurality of logical addresses and a plurality of physical addresses; if it is determined to create the backup table, copying first data located at a first physical address in the source physical unit to a second physical address in the target physical unit, and recording the second physical address in the backup table; and determining whether to update the second physical address to the logical-to-physical mapping table based on information in the backup table.

In order to make the above-mentioned features and advantages of the disclosure clearer and easier to understand, the following embodiments are given and described in details with accompanying drawings as follows.

BRIEF DESCRIPTION OF THE DRAWINGS

FIG. 15 is a schematic diagram of updating a logical-to-physical mapping table according to a physical-to-logical mapping table according to an embodiment of the disclosure.

DESCRIPTION OF THE EMBODIMENTS

Figure 1:
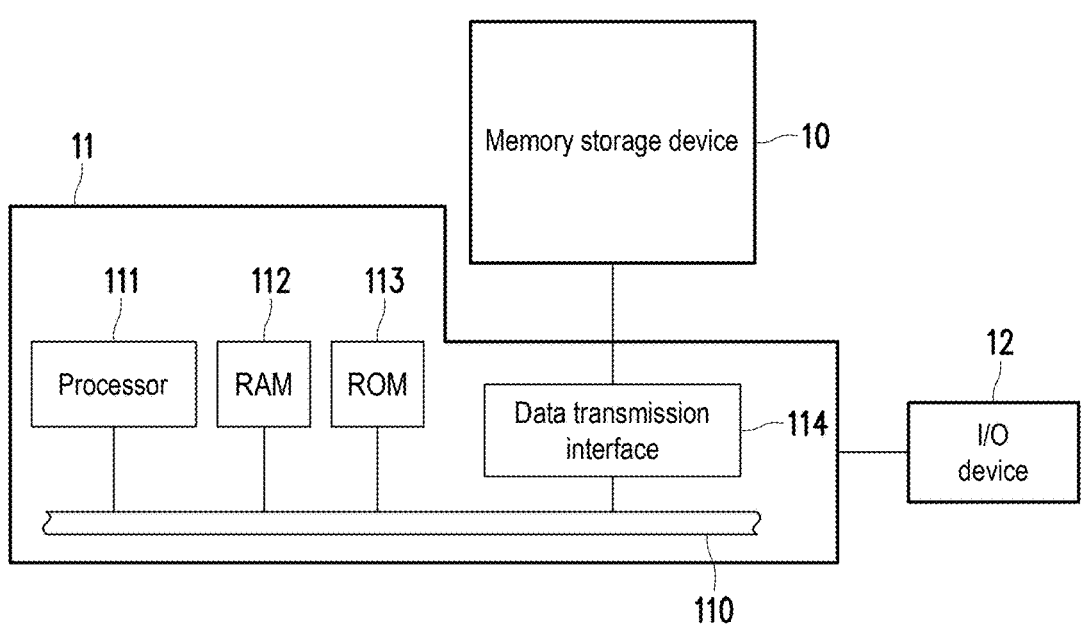
FIG. 1 is a schematic diagram of a host system, a memory storage device, and an input/output (I/O) device according to an exemplary embodiment of the disclosure.

Some of the embodiments of the disclosure will be described in detail below with reference to the accompanying drawings. Components labeled with the same reference numerals shown in different drawings will be regarded as the same or similar components. The embodiments are only a part of the disclosure and do not disclose all the possible implementations of the disclosure. More specifically, the embodiments are only examples of the system and the method in the claims of the disclosure.

The terms "first", "second", etc. used herein do not specifically refer to the sequence or order, but are only used to distinguish components or operations described with the same technical terms.

Generally speaking, a memory storage device (also known as a memory storage system) includes a rewritable non-volatile memory module and a controller (also known as a control circuit). The memory storage device may be used with a host system such that the host system may write data to the memory storage device or read data from the memory storage device.

Figure 2:
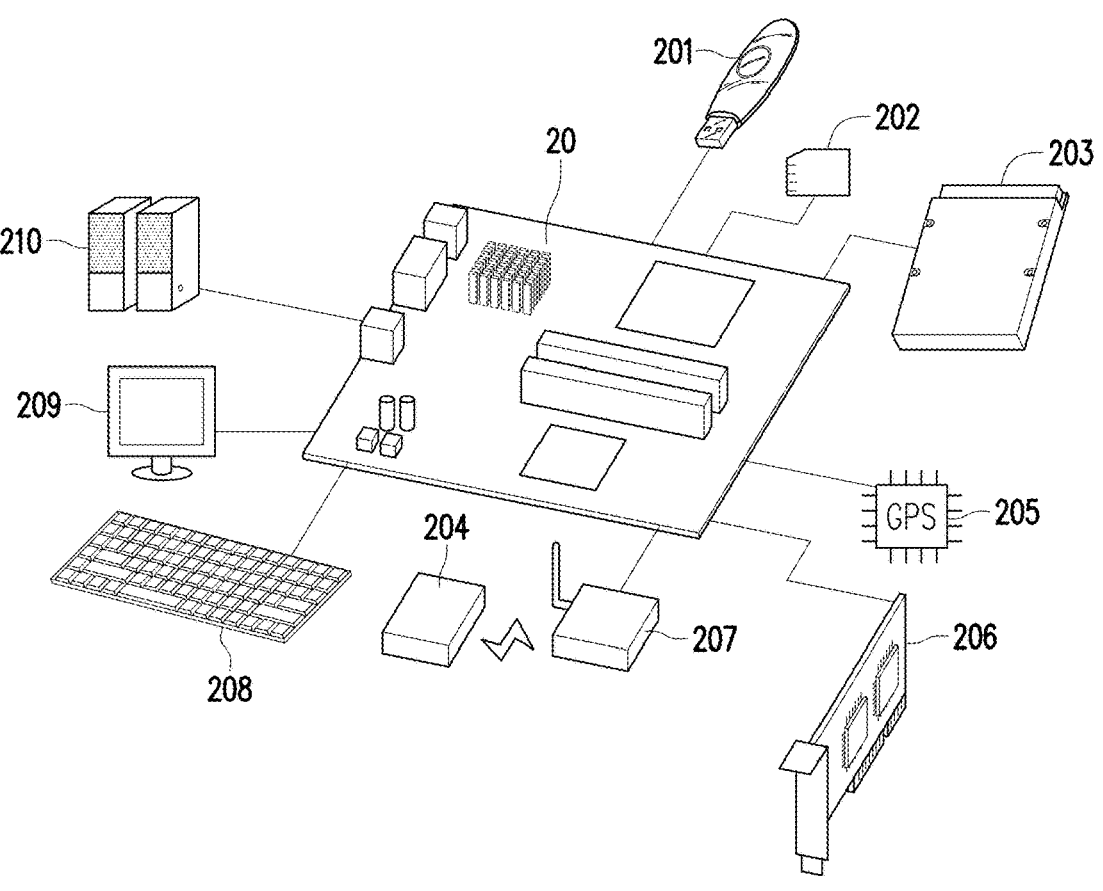
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Referring to FIG. 1 and FIG. 2, a host system 11 may include a processor 111, a random access memory (RAM) 112, a read only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to a memory storage device 10 through the data transmission interface 114. For example, the host system 11 may store data to the memory storage device 10 or read data from the memory storage device 10 through the data transmission interface 114. In addition, the host system 11 may be coupled to an I/O device 12 through the system bus 110. For example, the host system 11 may transmit output signals to the I/O device 12 or receive input signals from the I/O device 12 via the system bus 110.

In an exemplary embodiment, the processor 111, the RAM 112, the ROM 113, and the data transmission interface 114 may be disposed on a motherboard 20 of the host system 11. The number of data transmission interfaces 114 may be one or more. Through the data transmission interface 114, the motherboard 20 may be coupled to the memory storage device 10 through wired or wireless methods.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a wireless fax (WiFi) memory storage device, a Bluetooth memory storage device, or a low-power Bluetooth memory storage device (e.g., iBeacon), and other memory storage devices based on various wireless communication technologies. Also, the motherboard 20 may also be coupled to various I/O devices such as a global positioning system (GPS) module 205, a network interface card 206, a wireless transmission device 207, a keyboard 208, a screen 209, and a speaker 210 through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, host system 11 may be any system that may substantially cooperate with a memory storage device to store data. In an exemplary embodiment, the memory storage device 10 and the host system 11 may include a memory storage device 30 and a host system 31 of FIG. 3 respectively.

Figure 3:
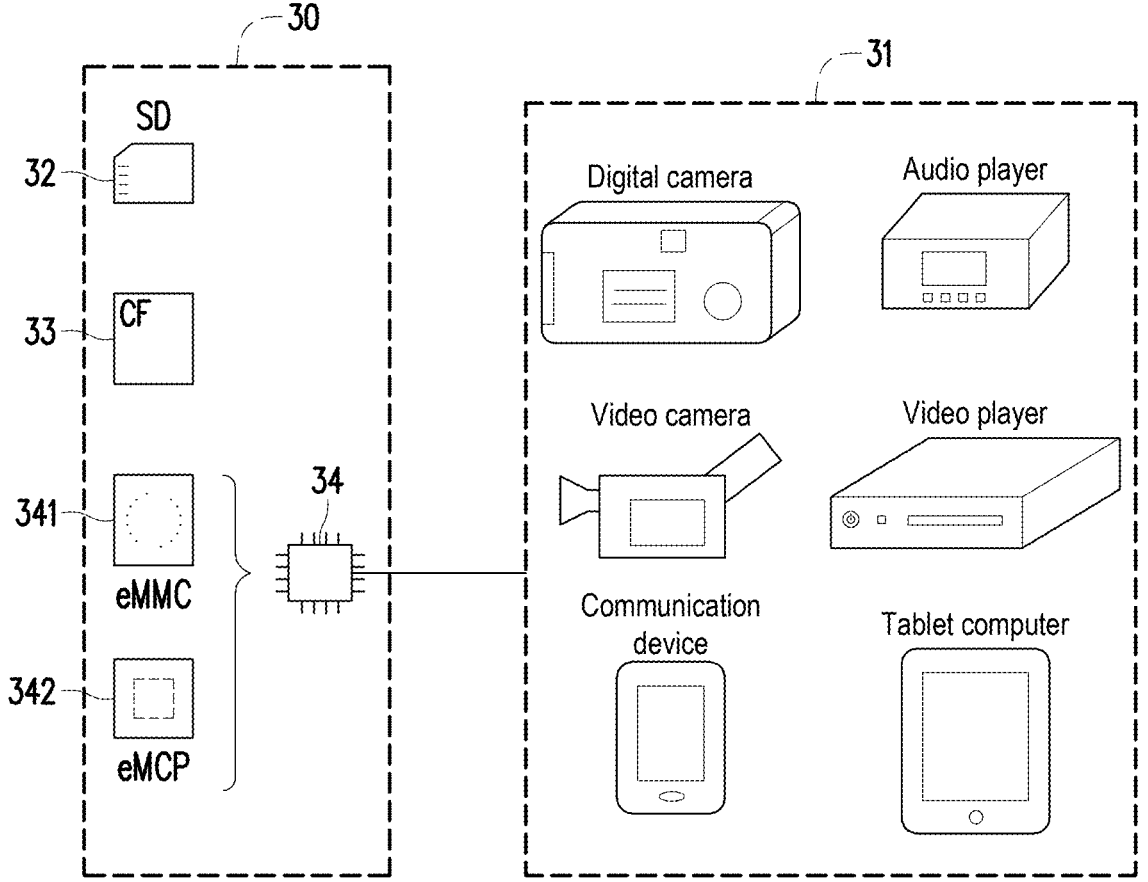
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Referring to FIG. 3, the memory storage device 30 may be used in conjunction with the host system 31 to store data. For example, the host system 31 may be a system such as a digital camera, a video camera, a communication device, an audio player, a video player, or a tablet computer, and the memory storage device 30 may be various non-volatile memory storage devices such as a secure digital (SD) card 32, a compact flash (CF) card 33, or an embedded storage device 34 used by the host system 31. The embedded storage device 34 includes various types of embedded storage devices such as an embedded multi media card (eMMC) 341 and/or an embedded multi chip package (eMCP) storage device 342 that directly couple the memory module to the substrate of the host system.

Figure 4:
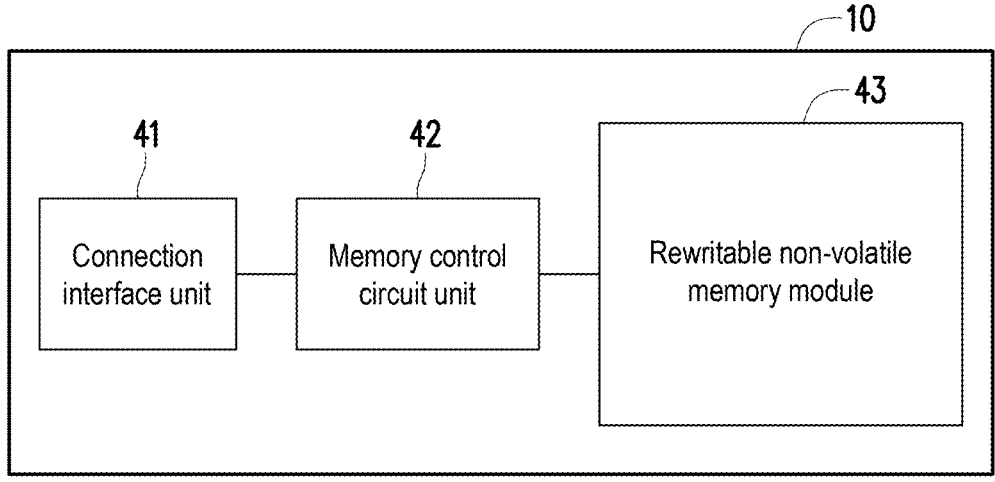
FIG. 4 is a schematic diagram of a memory storage device according to an exemplary embodiment of the disclosure.

FIG. 4 is a schematic diagram of a memory storage device according to an exemplary embodiment of the disclosure. Referring to FIG. 4, the memory storage device 10 includes a connection interface unit 41, a memory control circuit unit 42, and a rewritable non-volatile memory module 43.

The connection interface unit 41 is configured to couple to the host system 11. The memory storage device 10 may communicate with the host system 11 via the connection interface unit 41. In an exemplary embodiment, the connection interface unit 41 is compatible with the Peripheral Component Interconnect Express (PCI Express) standard. In an exemplary embodiment, the connection interface unit 41 may also be in compliance with the Serial Advanced Technology Attachment (SATA) standard, the Parallel Advanced Technology Attachment (PATA) standard, the Institute of Electrical and Electronic Engineers (IEEE) 1394 standard, the Universal Serial Bus (USB) standard, the SD interface standard, the Ultra High Speed-I (UHS-I) interface standard, the Ultra High Speed-II (UHS-II) interface standard, the Memory Stick (MS) interface standard, the MCP interface standard, the MMC interface standard, the eMMC interface standard, the Universal Flash Storage (UFS) interface standard, the eMCP interface standard, the Cf interface standard, the integrated Device Electronics (IDE) standard, or other suitable standards. The connection interface unit 41 and the memory control circuit unit 42 may be packaged in a chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is configured to execute a plurality of logic gates or control commands implemented in hardware mode or firmware mode and perform operations such as writing, reading, and erasing data in the rewritable non-volatile memory module 43 according to the commands of the host system 11.

The rewritable non-volatile memory module 43 is configured to store data written by the host system 11. The rewritable non-volatile memory module 43 may include a single level cell (SLC) NAND flash memory module (i.e., a flash memory module that may store 1 bit in one memory cell), a multi level cell (MLC) NAND flash memory module (i.e., a flash memory module that may store 2 bits in one memory cell), a triple level cell (TLC) NAND flash memory module (i.e., a flash memory module that may store 3 bits in one memory cell), a quad level cell (QLC) NAND flash memory module (i.e., a flash memory module that may store 4 bits in one memory cell), other flash memory modules, or other memory modules with the same characteristics.

Each memory cell in the rewritable non-volatile memory module 43 stores one or more bits based on changes in voltage (hereinafter also referred to as threshold voltage). Specifically, there is a charge trapping layer between the control gate and the channel of each memory cell. By applying a write voltage to the control gate, the amount of electrons in the charge trapping layer may be changed, thereby changing the threshold voltage of the memory cell. Such an operation of changing the threshold voltage of the memory cell is also referred to as "writing data to the memory cell" or "programming the memory cell." As the threshold voltage changes, each memory cell in the rewritable non-volatile memory module 43 has a plurality of storage states. By applying a read voltage, it is possible to determine which storage state a memory cell belongs to, thereby obtaining one or more bits stored in the memory cell.

In an exemplary embodiment, the memory cells of the rewritable non-volatile memory module 43 may constitute a plurality of physical programming units, and the physical programming units may constitute a plurality of physical erasing units. Specifically, memory cells on the same word line may form one or more physical programming units. If each memory cell may store 2 or more bits, the physical programming units on the same word line may be at least classified into lower physical programming units and upper physical programming units. For example, the least significant bit (LSB) of a memory cell belongs to the lower physical programming unit, and the most significant bit (MSB) of a memory cell belongs to the upper physical programming unit. Generally speaking, in an MLC NAND flash memory, the write speed of the lower physical programming unit will be greater than the write speed of the upper physical programming unit, and/or the reliability of the lower physical programming unit is higher than the reliability of the upper physical programming unit.

In an exemplary embodiment, the physical programming unit is the smallest unit of programming. That is, the physical programming unit is the smallest unit for writing data. For example, the physical programming unit may be a physical page or a physical sector. If the physical programming units are physical pages, the physical programming units may include data bit areas and redundancy bit areas. The data bit area contains a plurality of physical sectors for storing user data, while the redundancy bit area is configured to store system data (for example, management data such as error correcting codes). In an exemplary embodiment, the data bit area includes 32 physical sectors, and the size of one physical sector is 512 bytes (B). However, in other exemplary embodiments, the data bit area may also include 8, 16, or more or less physical sectors, and the size of each physical sector may also be larger or smaller. On the other hand, the physical erasing unit is the smallest unit of erasing. That is, each physical erasing unit contains the smallest number of memory cells to be erased together. For example, the physical erasing unit is a physical block.

Figure 5:
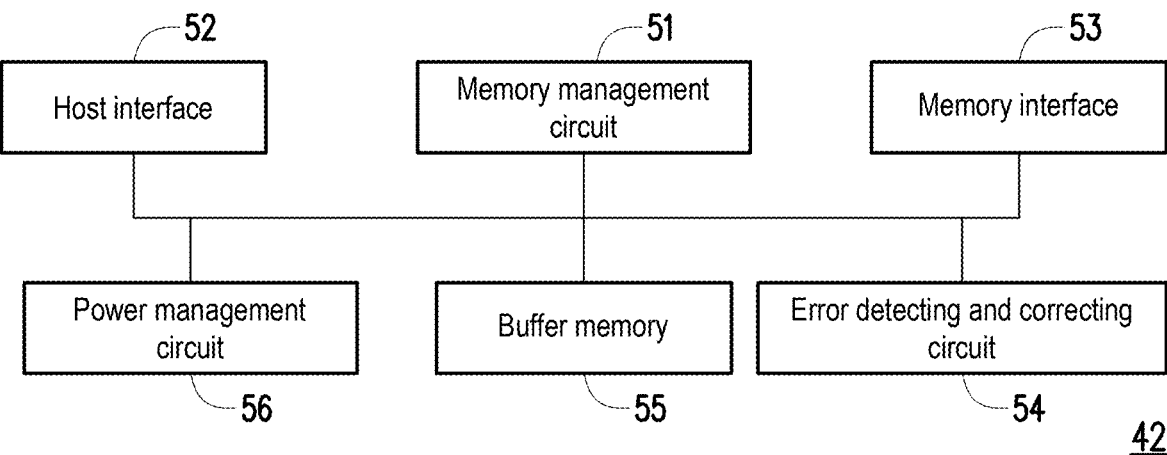
FIG. 5 is a schematic diagram of a memory control circuit unit according to an exemplary embodiment of the disclosure.

FIG. 5 is a schematic diagram of a memory control circuit unit according to an exemplary embodiment of the disclosure. Referring to FIG. 5, the memory control circuit unit 42 includes a memory management circuit 51, a host interface 52, and a memory interface 53.

The memory management circuit 51 is configured to control the overall operation of the memory control circuit unit 42. Specifically, the memory management circuit 51 has a plurality of control commands, and when the memory storage device 10 is operating, the control commands will be executed to perform operations such as writing, reading, and erasing data. When the operation of the memory management circuit 51 is described below, it is equivalent to describing the operation of the memory control circuit unit 42 and the memory storage device 10.

In an exemplary embodiment, the control commands of the memory management circuit 51 are implemented in firmware form. For example, the memory management circuit 51 has a microprocessor unit (not shown) and a read only memory (not shown), and the control commands are burned into the read only memory. When the memory storage device 10 is operating, the control commands will be executed by the microprocessor unit to perform operations such as writing, reading, and erasing data.

In an exemplary embodiment, the control commands of the memory management circuit 51 may also be stored in a specific area of the rewritable non-volatile memory module 43 in the form of program code (for example, the system area in the memory module dedicated to storing system data). In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit will first execute the boot code to load the control commands stored in the rewritable non-volatile memory module 43 into the random access memory of the memory management circuit 51. Afterwards, the microprocessor unit will run the control commands to perform operations such as writing, reading, and erasing data.

In an exemplary embodiment, the control commands of the memory management circuit 51 may also be implemented in a hardware form. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 43. The memory write circuit is configured to issue a write command sequence to the rewritable non-volatile memory module 43, so as to write data to the rewritable non-volatile memory module 43. The memory read circuit is configured to issue a read command sequence to the rewritable non-volatile memory module 43, so as to read data from the rewritable non-volatile memory module 43. The memory erase circuit is configured to issue an erase command sequence to the rewritable non-volatile memory module 43, so as to erase data from the rewritable non-volatile memory module 43. The data processing circuit is configured to process data to be written to the rewritable non-volatile memory module 43 and data to be read from the rewritable non-volatile memory module 43. The write command sequence, the read command sequence, and the erase command sequence may each include one or more program codes or command codes and are configured to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct to execute corresponding operations.

The host interface 52 is coupled to the memory management circuit 51. The memory management circuit 51 may communicate with the host system 11 through the host interface 52. The host interface 52 may be used to obtain and identify commands and data sent by the host system 11. For example, commands and data sent by the host system 11 may be sent to the memory management circuit 51 through the host interface 52. In addition, the memory management circuit 51 may transmit data to the host system 11 through the host interface 52. In the exemplary embodiment, the host interface 52 is compatible with the PCI Express standard. However, it must be understood that the disclosure is not limited thereto; the host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and configured to access the rewritable non-volatile memory module 43. For example, the memory management circuit 51 may access the rewritable non-volatile memory module 43 through the memory interface 53. That is to say, the data to be written to the rewritable non-volatile memory module 43 will be converted into a format acceptable to the rewritable non-volatile memory module 43 through the memory interface 53. Specifically, if the memory management circuit 51 wants to access the rewritable non-volatile memory module 43, the memory interface 53 will send corresponding command sequences. For example, the command sequences may include a write command sequence instructing to write data, a read command sequence instructing to read data, an erase command sequence instructing to erase data, and corresponding command sequences configured to instruct various memory operations (for example, changing a read voltage level or performing garbage collection (GC) operation, etc.). The command sequences are generated, for example, by the memory management circuit 51 and sent to the rewritable non-volatile memory module 43 through the memory interface 53. The command sequences may include one or more signals or data on the bus. The signals or data may include scripts or program codes. For example, the read command sequence will include information such as a read recognition code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and configured to perform error detecting and correction operations to ensure the accuracy of the data. Specifically, when the memory management circuit 51 obtains the write command from the host system 11, the error detecting and correcting circuit 54 will generate a corresponding error correcting code (ECC) and/or error detecting code (EDC) for the data corresponding to the write command, and the memory management circuit 51 will write the data corresponding to the write command and the corresponding error correcting code and/or error detecting code to the rewritable non-volatile memory module 43. Afterwards, when reading data from the rewritable non-volatile memory module 43, the memory management circuit 51 will also read the error correcting code and/or error detecting code corresponding to the data, and the error detecting and correcting circuit 54 will perform error detecting and correcting operations on the read data based on the error correcting code and/or the error detecting code. For example, the error detecting and correcting circuit 54 may use various encoding/decoding algorithms such as a low density parity check code (LDPC code), a BCH code, a Reed-solomon code (RS code), or an Exclusive OR (XOR) code to encode and decode data.

The buffer memory 55 is coupled to the memory management circuit 51 and configured to temporarily store data. The power management circuit 56 is coupled to the memory management circuit 51 and configured to control the power supply of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
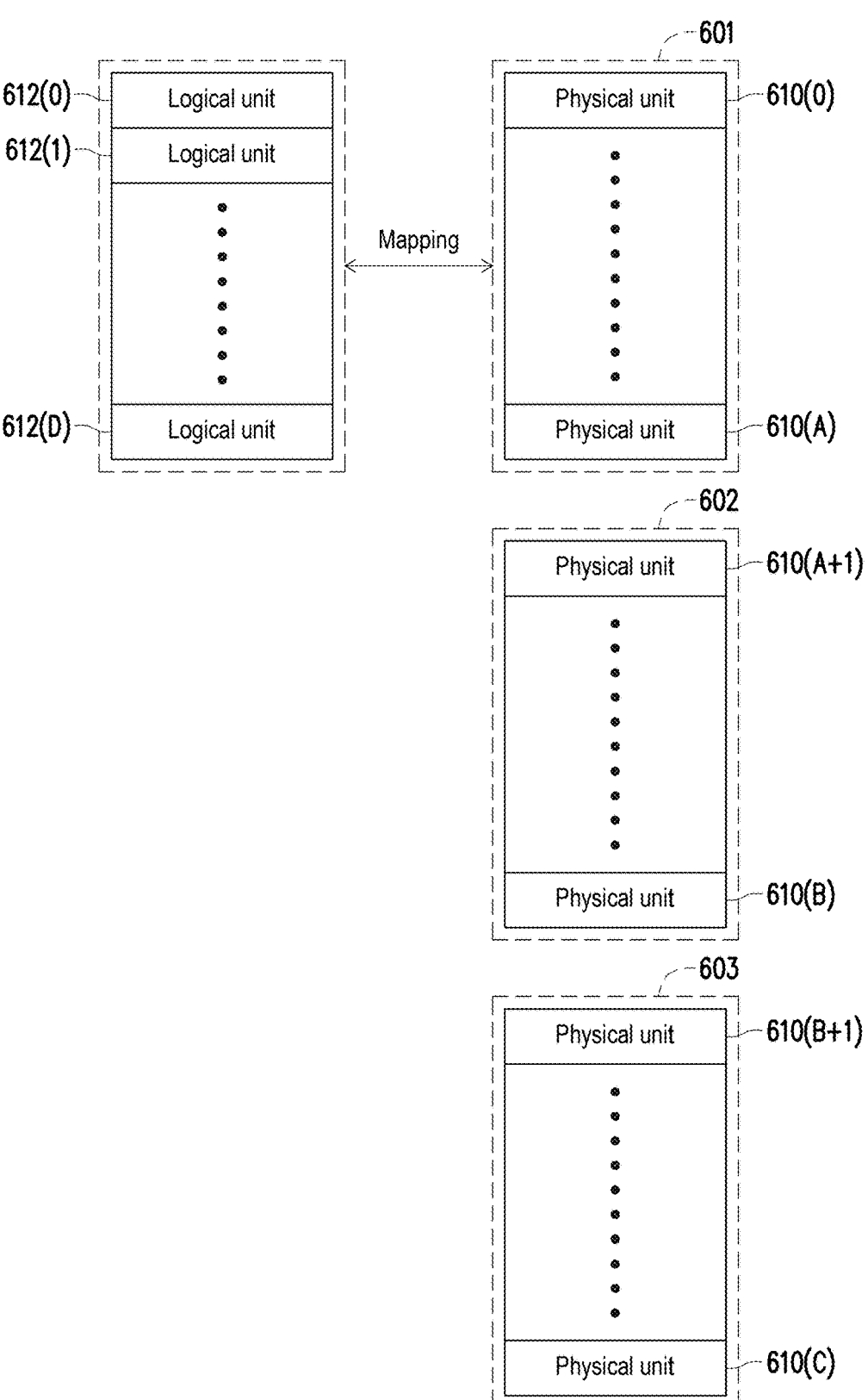
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Referring to FIG. 6, the memory management circuit 51 may logically group the physical units 610(0) to 610(C) in the rewritable non-volatile memory module 43 into a storage area 601, a spare area 602, and a system area 603.

In an exemplary embodiment, a physical unit refers to a physical address or a physical programming unit. In an exemplary embodiment, a physical unit may also be composed of a plurality of continuous or discontinuous physical addresses. In an exemplary embodiment, a physical unit may also refer to a virtual block (VB). A virtual block may include a plurality of physical addresses or a plurality of physical programming units. In an exemplary embodiment, a virtual block may include one or more physical erasing units.

In an exemplary embodiment, the physical units 610(0) to 610(A) in the storage area 601 are configured to store user data (e.g., user data from the host system 11 of FIG. 1). For example, the physical units 610(0) to 610(A) in the storage area 601 may store valid data and invalid data. The physical units 610 (A+1) to 610 (B) in the spare area 602 do not store data (e.g., valid data). For example, if a certain physical unit does not store valid data, such a physical unit may be associated (or added) to the spare area 602. In addition, the physical units in the spare area 602 (or the physical units that do not store valid data) may be erased. As new data is written, one or more physical units may be retrieved from the spare area 602 to store the new data. In an exemplary embodiment, the spare area 602 is also referred to as a free pool.

In an exemplary embodiment, the memory management circuit 51 may configure the logical units 612(0) to 612(D) to map the physical units 610(0) to 610(A) in the storage area 601. In an exemplary embodiment, each logical unit corresponds to a logical address. For example, a logical address may include one or more logical block addresses (LBA) or other logical management units. In an exemplary embodiment, a logical unit may also correspond to a logical programming unit or be composed of a plurality of continuous or discontinuous logical addresses.

It should be noted that a logical unit may be mapped to one or more physical units. If a certain physical unit is currently mapped by a certain logical unit, it means that the data currently stored in the physical unit includes valid data. On the contrary, if a certain physical unit is not currently mapped by any logical unit, it means that the data currently stored in the physical unit is invalid data.

In an exemplary embodiment, physical units that are not mapped by logical units, physical units that do not store valid data, and/or physical units that have been erased are also referred to as spare physical units. When new data needs to be stored, the memory management circuit 51 may instruct the rewritable non-volatile memory module 43 to store the data in a certain spare physical unit. In addition, the memory management circuit 51 may perform a data merging operation to release new spare physical units. For example, the data merging operation may include a garbage collection (GC) operation. By performing the data merging operation, the total number of spare physical units may be increased and/or maintained at no less than a specified number.

In an exemplary embodiment, the memory management circuit 51 may record management data describing the mapping relationship between logical units and physical units (also referred to as logical-to-physical mapping information) in at least one logical-to-physical mapping table (L2P table). When the host system 11 wants to read data from the memory storage device 10 or write data to the memory storage device 10, the memory management circuit 51 may access the rewritable non-volatile memory module 43 according to the information in the logical-to-physical mapping table.

In an exemplary embodiment, the memory management circuit 51 may store specific types of data in the system area 603. For example, the physical units 610(B+1) to 610(C) in the system area 603 may be dedicated to storing data of higher importance and/or data that is not intended to be accessed or modified by the host system 11. For example, the data of higher importance and/or data not intended to be accessed or modified by the host system 11 may include a logical-to-physical mapping table, a bad block management table, a wear leveling management table, a valid data management table, and/or other types of management data, and the disclosure is not limited thereto. The logical-to-physical mapping table is configured to record mapping information. Such a mapping information may reflect the mapping relationship between logical units and physical units. The bad block management table is configured to record information related to at least one bad block in the rewritable non-volatile memory module 43. The wear leveling management table may be used to record information (such as read count, write count, and/or erase count) related to the wear status of at least one physical unit in the rewritable non-volatile memory module 43. The valid data management table may be used to record information related to the valid count of at least one physical unit in the rewritable non-volatile memory module 43.

In an exemplary embodiment, the memory management circuit 51 may not map any logical cells to the physical units in the system area 603, which may prevent the data stored in the system area 603 from being accessed or modified by the host system 11.

In an exemplary embodiment, the physical units 610(0) to 610(C) in the rewritable non-volatile memory module 43 may include first type physical units and second type physical units. For example, each physical unit in the rewritable non-volatile memory module 43 may be one of a first type physical unit and a second type physical unit. For example, in the rewritable non-volatile memory module 43, the total number of first type physical units will be less than the total number of second type physical units, the data access speed of each first type physical unit will be higher than the data access speed of each second type physical unit, and/or the data capacity of each first type physical unit will be less than the data capacity of each second type physical unit.

In an exemplary embodiment, the first type physical unit may be regarded as a temporary storage area or buffer area of data, and the second type physical unit may be regarded as a storage area of data. In an exemplary embodiment, data from the host system 11 may be quickly stored into the first type physical unit through higher write efficiency. In response to the data from the host system 11 being stored in the first type physical unit, a write completion message may be sent back to the host system 11. Thereafter, data stored in the first type physical unit may be copied to a second type physical unit with larger data capacity for storage in background operations. Then, the used first type physical unit may be released and erased to continue to receive (i.e., store) new data from the host system 11.

In an exemplary embodiment, the memory management circuit 51 may instruct the rewritable non-volatile memory module 43 to program the first type physical unit based on a certain programming mode (also referred to as a first programming mode), so as to store data into the first type physical unit. On the other hand, the memory management circuit 51 may instruct the rewritable non-volatile memory module 43 to program the second type physical unit based on another programming mode (also referred to as a second programming mode) so as to store data in the second type physical unit. The first programming mode is different from the second programming mode.

In an exemplary embodiment, the first programming mode is configured to store P bits in a single memory cell in the first type physical unit, and the second programming mode is configured to store Q bits in a single memory cell in the second type physical unit. Both P and Q are positive integers, and P is not equal to Q.

In an exemplary embodiment, P is smaller than Q. For example, P may be "1" and Q may be "2", "3", or "4". In an exemplary embodiment, when the number of memory cells is the same, the data capacity of each first type physical unit may be P/Q of the data capacity of each second type physical unit. For example, assuming that P and Q are "1" and "4" respectively, the data capacity of each first type physical unit may be ¼ of the data capacity of each second type physical unit.

In an exemplary embodiment, the first programming mode refers to one of the SLC programming mode, the pseudo SLC programming mode, the lower physical programming mode, the mixture programming mode, and the less layer memory cell mode. In the SLC programming mode and the pseudo SLC programming mode, a memory cell only stores one bit of data. In the lower physical programming mode, only the lower physical programming unit will be programmed, and the upper physical programming unit corresponding to the lower physical programming unit may not be programmed. In the mixed programming mode, the valid data (or real data) will be programmed in the lower physical programming unit, and at the same time, the dummy data will be programmed in the upper physical programming unit corresponding to the lower physical programming unit that stores the valid data. In the less layer memory cell mode, a memory cell stores a first number of bits of data. For example, the first number may be set to "1".

In an exemplary embodiment, the second programming mode refers to an MLC programming mode, a TLC programming mode, a QLC programming mode, or a similar mode. In the second programming mode, a memory cell may store a second number of bits of data, where the second number is equal to or greater than "2". For example, the second number may be set to "2", "3", or "4". In another exemplary embodiment, both the first number in the first programming mode and the second number in the second programming mode may be other numbers, as long as the second number is greater than the first number.

Figure 7:
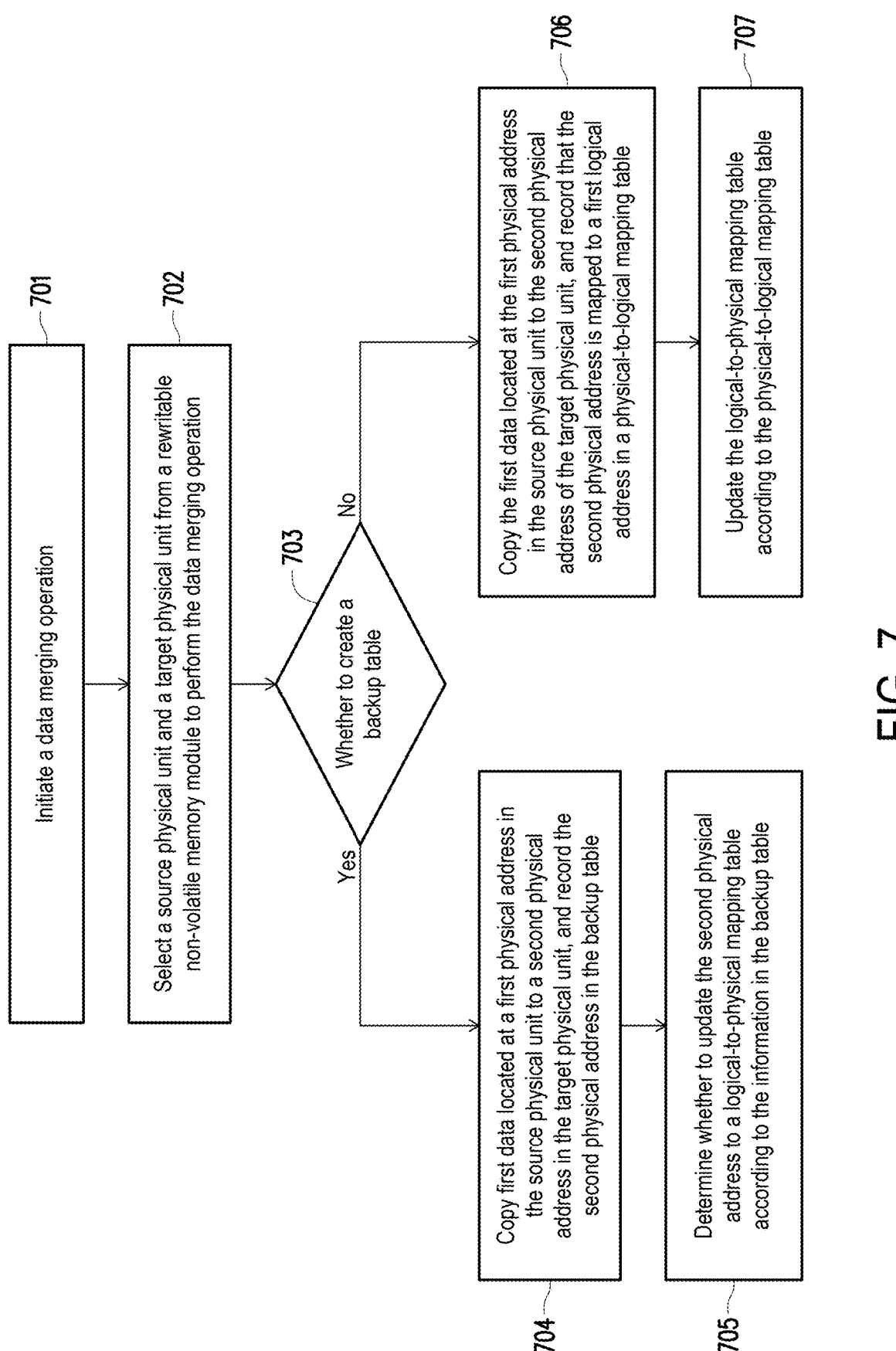
FIG. 7 is a flowchart of a memory management method according to an embodiment of the disclosure.
Figure 8:
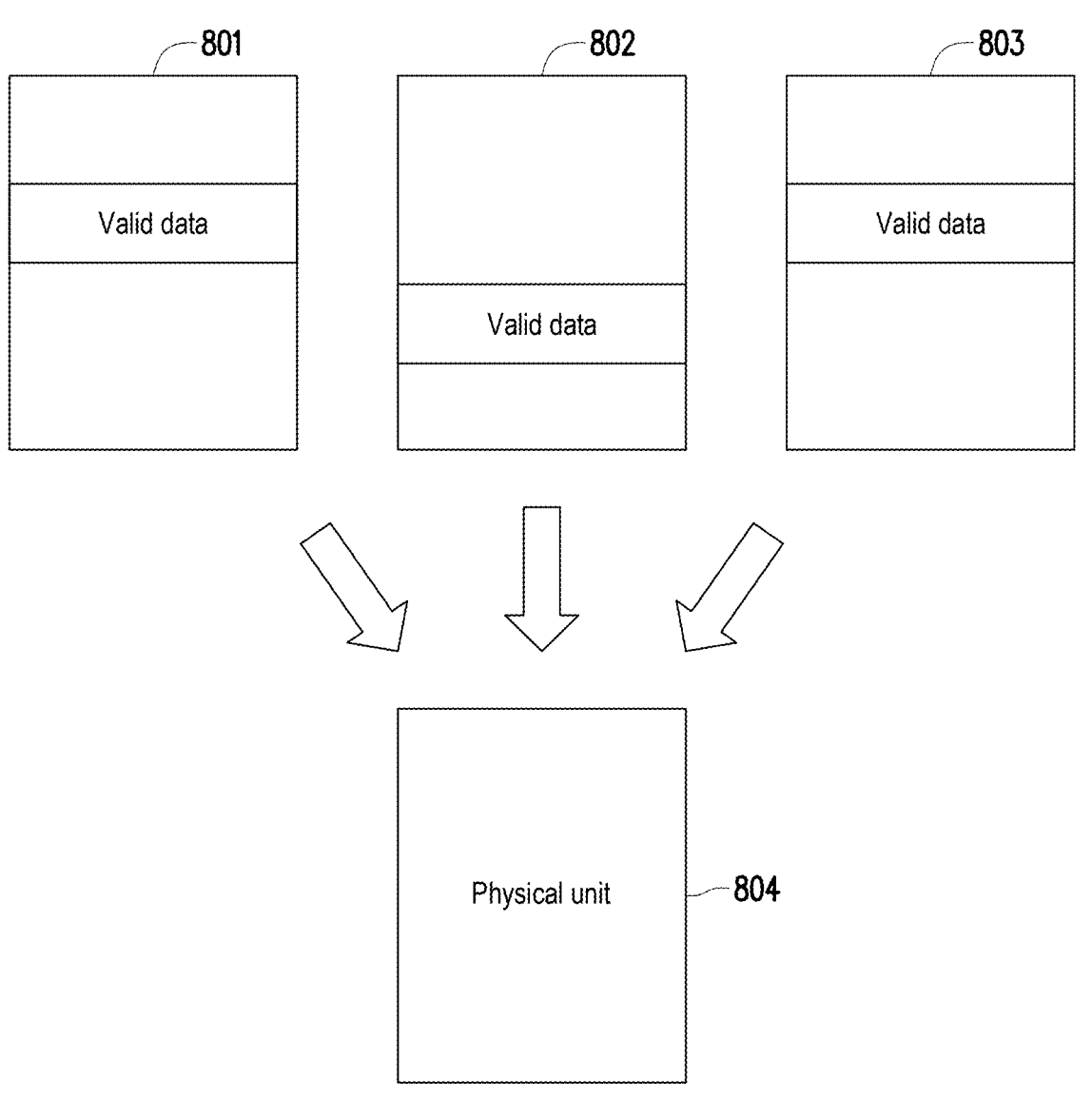
FIG. 8 is a schematic diagram of a data merging operation according to an embodiment of the disclosure.

The following describes a memory management method for updating the logical-to-physical mapping table after a data merging operation. In particular, in one case, the backup table of the logical-to-physical mapping table is used for updating, and in another case, the physical-to-logical mapping table is used for updating. FIG. 7 is a flowchart of a memory management method according to an embodiment of the disclosure. Referring to FIG. 7, steps 701 to 707 are executed by the memory management circuit 51, and will not be repeated here. In step 701, a data merging operation is initiated. In step 702, a source physical unit and a target physical unit are selected from the rewritable non-volatile memory module 43 to perform the data merging operation. FIG. 8 is a schematic diagram of a data merging operation according to an embodiment of the disclosure. Referring to FIG. 7 and FIG. 8, in the embodiment, physical units 801 to 803 are selected as the source physical units, and a physical unit 804 is selected as the target physical unit. The data merging operation is configured to transfer the valid data in the physical units 801 to 803 to the physical unit 804. After the valid data is transferred, the physical units 801 to 803 may be erased to become spare physical units. In some embodiments, the source physical units 801 to 803 belong to the first type physical unit or the second type physical unit, and the target physical unit 804 belongs to the second type physical unit.

Figure 9:
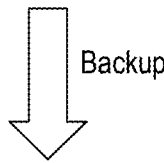
FIG. 9 is a schematic diagram of a backup table according to an embodiment of the disclosure.

Next, in step 703, it is determined whether to create a backup table corresponding to a logical-to-physical mapping table. The backup table is configured to store a mapping relationship between logical addresses and physical addresses during the data merging operation. FIG. 9 is a schematic diagram of a backup table according to an embodiment of the disclosure. Referring to FIG. 9, a logical-to-physical mapping table 910 stores logical addresses L(0) to L(3) and physical addresses P(0) to P(3). The logical address L(0) is mapped to the physical address P(0), the logical address L(1) is mapped to the physical address P(1), and so on. In other words, the logical-to-physical mapping table 910 includes a mapping relationship between the logical addresses L(0) to L(3) and the physical addresses P(0) to P(3). A backup table 920 also includes the mapping relationship between the logical addresses L(0) to L(3) and the physical addresses P(0) to P(3), and additionally includes a field to record the merging physical address. The merging physical address is configured to record the physical address to which valid data is transferred during the data merging operation.

When the host system 11 issues a write command, the memory management circuit 51 will extract a physical unit (referred to as a first physical unit) from the spare area 602 as an active physical unit, and write the data of the write command to the active physical unit in the first programming mode. That is to say, the active physical unit belongs to the first type physical unit. From another perspective, there is still free space in the active physical unit to store data and does not need to be erased. At this time, the physical unit is referred to as being open. When the free space in the active physical unit is used up (all data is stored), the physical unit will be closed and is later referred to as a non-active physical unit. When data is to be written to the non-active physical unit, the valid data must be first transferred to other physical units, and the non-active physical unit must be erased.

When data is written to the active physical unit at a specific point in time, for example, before the active physical unit is closed, the memory management circuit 51 will create a physical-to-logical mapping table corresponding to the physical unit to store the mapping relationship between the logical addresses corresponding to each physical address in the physical unit. Such a physical-to-logical mapping table may later be used during the data merging operation or after a power outage.

In some embodiments, if the source physical unit of the data merging operation and the first physical unit currently executing the write command are the same, it is determined in step 703 that a backup table is to be created, and then steps 704 to 705 are executed. On the contrary, if the source physical unit of the data merging operation is different from the first physical unit, it is determined not to create a backup table in step 703, and then steps 706 to 707 will be executed.

In some embodiments, if the source physical unit of the data merging operation is the active physical unit or the source physical unit has not been closed, it is determined in step 703 that a backup table needs to be created. In other words, if there is free space in the source physical unit to store data, and there is no need to erase the data before storing the data, it is determined in step 703 that a backup table needs to be created. Otherwise, the backup table is not created.

In some embodiments, the corresponding physical-to-logical mapping table is generated only when the active physical unit is closed. Therefore, step 703 may also determine whether the source physical unit has the corresponding physical-to-logical mapping table. If so, it means that the source physical unit has been closed, so it is determined not to create a backup table. If the source physical unit does not have the corresponding physical-to-logical mapping table, it means that the source physical unit is still open, so it is determined in step 703 that a backup table needs to be created.

Figure 10:
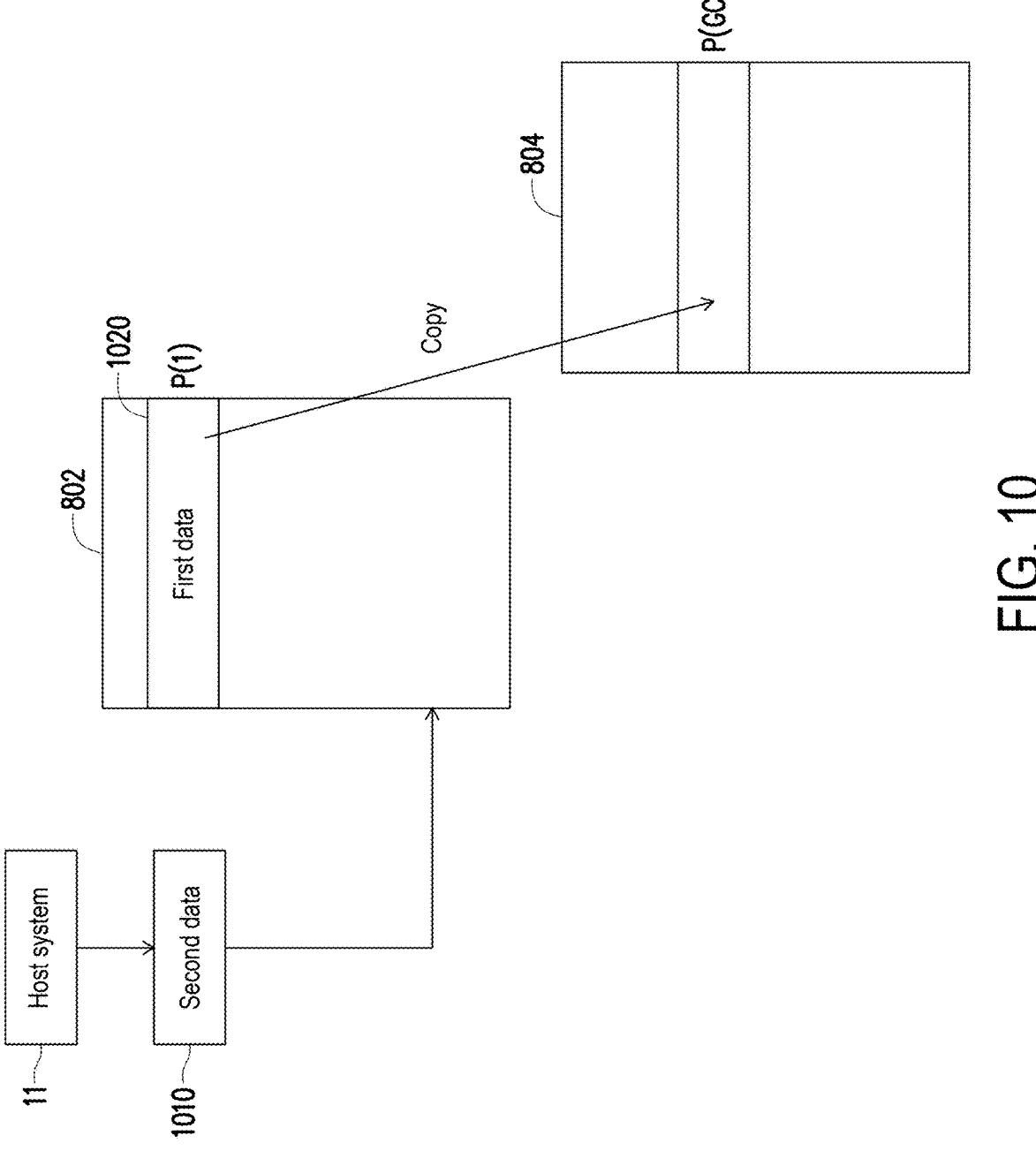
FIG. 10 is a schematic diagram of a data transfer in a context of creating a backup table according to an embodiment of the disclosure.

FIG. 10 is a schematic diagram of a data transfer in a context of creating a backup table according to an embodiment of the disclosure. Referring to FIG. 7, FIG. 8, and FIG. 10, it is assumed that the host system 11 issues a write command to the memory management circuit 51, and the write command is configured to write second data 1010 to a certain logical address. The memory management circuit 51 selects a physical unit 802 from the spare area 602 to store the second data 1010. At this time, the physical unit 802 is referred to as an active physical unit. On the other hand, the physical unit 802 is also selected as the source physical unit in the data merging operation. When the source physical unit is the active physical unit, data writing may occur while data is being transferred. In this state, the physical unit 802 does not necessarily have a physical-to-logical mapping table, or even if there is a physical-to-logical mapping table, the information therein may be incorrect. This is because the logical address found in the physical-to-logical mapping table may have been repeatedly written by the host system 11, so that the logical address that actually stores the valid data is not recorded in the physical-to-logical mapping table. Since it is impossible to confirm whether the information in the physical-to-logical mapping table is correct during the data merging operation, the memory management circuit 51 determines that a backup table needs to be created.

Figures 11, 12:
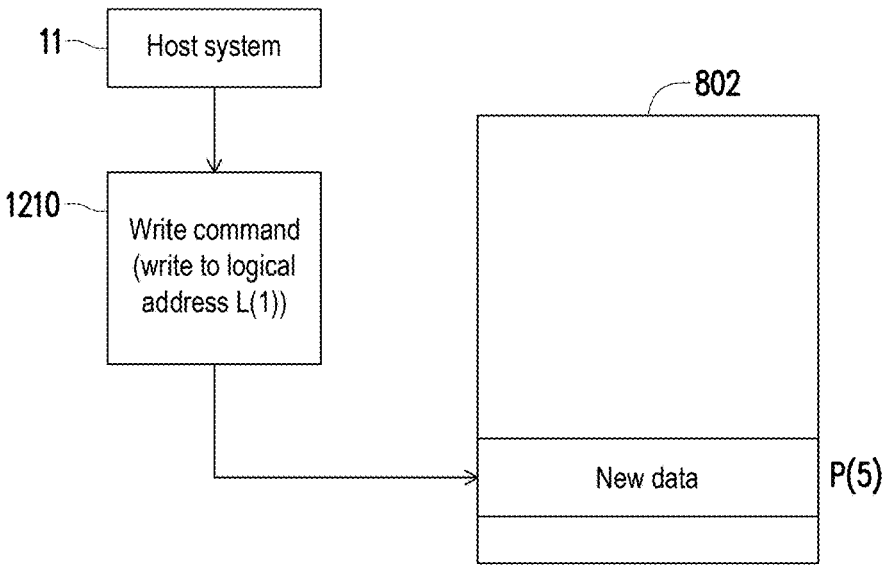
FIG. 11 is a schematic diagram of a backup table according to an embodiment of the disclosure.
FIG. 12 is a schematic diagram illustrating that a logical-to-physical mapping table does not need to be updated according to an embodiment of the disclosure.

In step 704, first data 1020 located at a first physical address P(1) in the source physical unit 802 is copied to a second physical address P(GC) in the target physical unit 804. In addition, the second physical address P(GC) is recorded in the backup table. FIG. 11 is a schematic diagram of a backup table according to an embodiment of the disclosure. Referring to FIG. 11, in the original backup table 920, the physical address P(1) is mapped to the logical address L(1), so the physical address P(GC) may be recorded in the "merging physical address" field and may correspond to the logical address L(1). The information in the backup table 920 indicates that the logical address L(1) was originally mapped to the physical address P(1), and the data originally stored at the physical address P(1) was transferred to the physical address P(GC) during the data merging operation.

Next, in step 705 of FIG. 7, it is determined whether to update the second physical address P(GC) to the logical-to-physical mapping table 910 according to the information in the backup table 920. In some embodiments, step 705 is executed after the data merging operation is completed, and if the host system 11 still writes data to the logical address L(1) during the data merging operation, the logical-to-physical mapping table 910 has the correct physical address, so there is no need to update according to the backup table 920. On the other hand, if the host system 11 does not write data to the logical address L(1) during the data merging operation, the logical-to-physical mapping table 910 needs to be updated according to the backup table 920.

Specifically, FIG. 12 is a schematic diagram illustrating that a logical-to-physical mapping table does not need to be updated according to an embodiment of the disclosure. The context of FIG. 12 occurs after FIG. 10, when the backup table 920 has been created. In FIG. 12, the host system 11 issues a write command 1210 to write new data to the logical address L(1). At this time, the physical unit 802 is still the active physical unit, so the memory management circuit 51 will write new data to a physical address P(5) in the physical unit 802 that has not yet been filled with data. On the other hand, the memory management circuit 51 updates the physical address P(5) to the logical-to-physical mapping table 910, so that the logical address L(1) maps to the physical address P(5).

Referring to FIG. 11 and FIG. 12, after performing the data merging operation, the memory management circuit 51 obtains the physical address P(5) mapped by the logical address L(1) from the logical-to-physical mapping table 910. The memory management circuit 51 also obtains the physical address P(1) mapped by the logical address L(1) from the backup table 920. Then it is determined whether to update the physical address P(GC) to the logical-to-physical mapping table 910 according to the comparison result between the physical address P(5) and the physical address P(1).

If the physical address obtained from the logical-to-physical mapping table 910 is located in the source physical unit and such a physical address is greater than the physical address obtained from the backup table 920, there is no need to update the physical address P(GC) to the logical-to-physical mapping table 910. In the embodiments of FIG. 11 and FIG. 12, the physical address P(5) is located in the source physical unit 802 and the physical address P(5) is greater than the physical address P(1). From another perspective, the programming order of the physical address P(5) follows the programming order of the physical address P(1), which means that the physical address P(5) is a newer and correct address, so there is no need to update the physical address P(GC) to the logical-to-physical mapping table 910.

Figure 13:
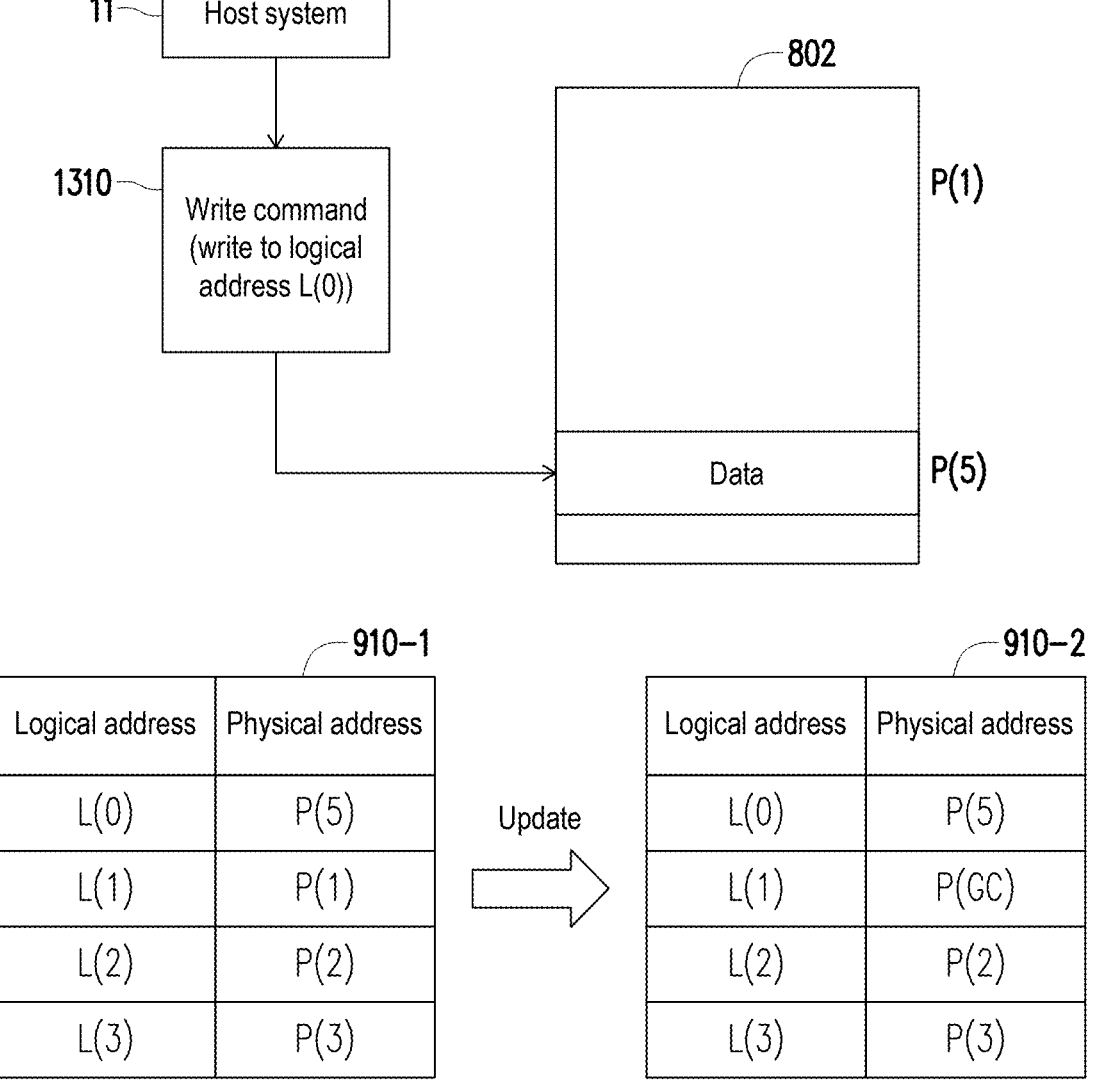
FIG. 13 is a schematic diagram illustrating the need to update a logical-to-physical mapping table according to an embodiment of the disclosure.

FIG. 13 is a schematic diagram illustrating the need to update a logical-to-physical mapping table according to an embodiment of the disclosure. FIG. 13 illustrates another context different from FIG. 12. FIG. 13 also occurs after FIG. 10. At this time, the backup table 920 has been created. During the data merging operation, the host system 11 issues a write command 1310 to write data to a logical address different from the logical address L(1), for example, writing to the logical address L(0). The logical address L(0) is originally mapped to the physical address P(0), and the physical address P(0) is not located in the physical unit 802. The memory management circuit 51 will write the data of the write command 1310 to the physical address P(5) in the physical unit 802, and then update the physical address P(5) to a logical-to-physical mapping table 910-1.

Referring to FIG. 11 and FIG. 13, after performing the data merging operation, the memory management circuit 51 obtains the physical address P(1) mapped by the logical address L(1) from the logical-to-physical mapping table 910-1. The memory management circuit 51 also obtains the physical address P(1) mapped by the logical address L(1) from the backup table 920. If the physical address obtained from the logical-to-physical mapping table 910-1 is located in the source physical unit 802 and the physical address is less than or equal to the physical address obtained from the backup table 920, the physical address P(GC) will be updated to the logical-to-physical mapping table 910-1. In the embodiment of FIG. 13, the physical address P(1) obtained from the logical-to-physical mapping table 910-1 is equal to the physical address P(1) obtained from the backup table 920. Therefore, the physical address P(GC) is updated to the logical-to-physical mapping table 910-1 to become a logical-to-physical mapping table 910-2 such that the logical address L(1) is mapped to the physical address P(GC).

In some embodiments, if a power outage or other accident occurs and the memory management circuit 51 loses the latest logical-to-physical mapping table, the memory management circuit 51 may read the old logical-to-physical mapping table from the rewritable non-volatile memory module 43. In this table, the logical address L(1) is mapped to another physical address, and the physical address is less than the physical address P(1) obtained from the backup table 920. In this context, the physical address P(GC) will still be updated to the logical-to-physical mapping table.

On the other hand, if the memory management circuit 51 obtains the physical address mapped by the logical address L(1) from the logical-to-physical mapping table 910 and determines that the physical address is not in the source physical unit 802, this means that the host system 11 has continuously written data so that there is no spare space in the physical unit 802 and another physical unit is used as the active physical unit. In this context, there is no need to update the physical address P(GC) in the backup table 920 to the logical-to-physical mapping table 910.

Figure 14:
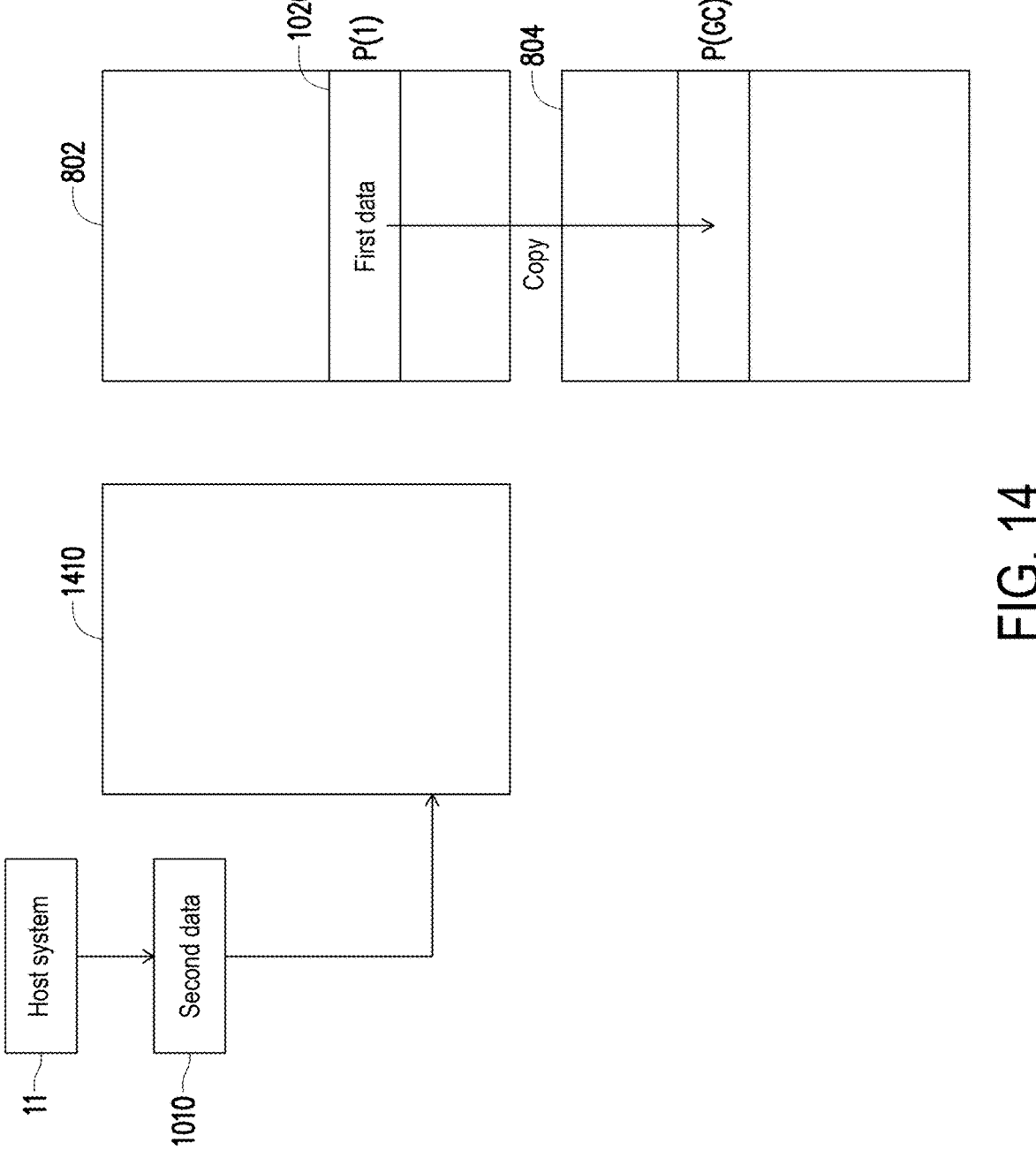
FIG. 14 is a schematic diagram of a data merging operation when no backup table is created according to an embodiment of the disclosure.

FIG. 14 is a schematic diagram of a data merging operation when no backup table is created according to an embodiment of the disclosure. Referring to FIG. 7 and FIG. 14, in the context of FIG. 14, the host system 11 issues a write command to write the second data 1010, and the memory management circuit 51 will write the second data 1010 to a physical unit 1410 extracted from the spare area 602. In addition, the source physical unit 802 selected by the data merging operation is different from the physical unit 1410, so it is determined in step 703 not to create the backup table. From another perspective, the source physical unit 802 selected by the data merging operation is not an active physical unit or the source physical unit 802 has been closed. Therefore, it is determined in step 703 not to create the backup table. In some embodiments, step 703 may also determine that the source physical unit 802 already has a corresponding physical-to-logical mapping table, and therefore determine not to create the backup table. When the backup table is not created, the physical-to-logical mapping table is configured to record the mapping relationship changed during the data merging operation, and the physical-to-logical mapping table is configured to update the logical-to-physical mapping table.

FIG. 15 is a schematic diagram of updating a logical-to-physical mapping table according to a physical-to-logical mapping table according to an embodiment of the disclosure. Please refer to FIG. 7, FIG. 14, and FIG. 15. In step 706, the first data 1020 located at the first physical address P(1) in the source physical unit 802 is copied to the second physical address P(GC) in the target physical unit 804, and the mapping of the second physical address P(GC) to the first logical address L(1) is recorded in a physical-to-logical mapping table 1510. The physical-to-logical mapping table 1510 also records the mapping relationships between other physical addresses P(GC−2), P(GC−1), and P(GC+1) and logical addresses. For the sake of simplicity, not all mapping relationships are shown in FIG. 15. After performing the data merging operation, in step 707, the logical-to-physical mapping table 910 is updated according to the physical-to-logical mapping table 1510, and becomes a logical-to-physical mapping table 910-3 after the update. The first logical address L(1) is mapped to the second physical address P(GC).

In the above memory management method, a backup table or a physical-to-logical mapping table may be used to update the logical-to-physical mapping table. In particular, when the source physical unit is the same as the active physical unit, data is transferred while writing, which makes the original method of using physical-to-logical mapping units unreliable. The backup table method proposed in the disclosure may solve this problem.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. A memory management method for a rewritable non-volatile memory module, wherein the rewritable non-volatile memory module comprises a plurality of physical units, and the memory management method comprises:

initiating a data merging operation;

selecting a source physical unit and a target physical unit from the rewritable non-volatile memory module to perform the data merging operation;

determining whether to create a backup table corresponding to a logical-to-physical mapping table, wherein the logical-to-physical mapping table comprises mapping relationships between a plurality of logical addresses and a plurality of physical addresses;

if it is determined that the backup table is created, copying first data located at a first physical address in the source physical unit to a second physical address in the target physical unit, and recording the second physical address in the backup table;

determining whether to update the second physical address to the logical-to-physical mapping table according to information in the backup table, wherein the logical-to-physical mapping table records a first logical address mapped to the first physical address; and if it is determined not to create the backup table, copying the first data located at the first physical address in the source physical unit to the second physical address in the target physical unit, and recording that the second physical address is mapped to the first logical address in a physical-to-logical mapping table, and after performing the data merging operation, updating the logical-to-physical mapping table according to the physical-to-logical mapping table such that the first logical address is mapped to the second physical address in the logical-to-physical mapping table.

2. The memory management method according to claim 1, wherein the backup table also records the first physical address and a first logical address mapped to the first physical address, and the step of determining whether to update the second physical address to the logical-to-physical mapping table according to the information in the backup table comprises:

after performing the data merging operation, obtaining a third physical address mapped by the first logical address from the logical-to-physical mapping table; and determining whether to update the second physical address to the logical-to-physical mapping table according to a comparison result between the first physical address and the third physical address.

3. The memory management method according to claim 2, wherein the step of determining whether to update the second physical address to the logical-to-physical mapping table according to the comparison result between the first physical address and the third physical address comprises:

if the third physical address is located in the source physical unit and the third physical address is greater than the first physical address, not updating the second physical address to the logical-to-physical mapping table.

4. The memory management method according to claim 3, wherein the step of determining whether to update the second physical address to the logical-to-physical mapping table according to the comparison result between the first physical address and the third physical address further comprises:

if the third physical address is located in the source physical unit and the third physical address is less than or equal to the first physical address, updating the second physical address to the logical-to-physical mapping table such that the first logical address is mapped to the second physical address.

5. The memory management method according to claim 4, further comprising:

if the third physical address is not located in the source physical unit, not updating the second physical address to the logical-to-physical mapping table.

6. The memory management method according to claim 1, further comprising:

writing second data from a host system to a first physical unit among the physical units, wherein the step of determining whether to create the backup table corresponding to the logical-to-physical mapping table comprises:

if the source physical unit is the same as the first physical unit, determining to create the backup table; otherwise, not creating the backup table.

7. The memory management method according to claim 1, wherein the step of determining whether to create the backup table corresponding to the logical-to-physical mapping table comprises:

if the source physical unit is an active physical unit or the source physical unit has not been closed, determining to create the backup table.

8. The memory management method according to claim 1, wherein the step of determining whether to create the backup table corresponding to the logical-to-physical mapping table comprises:

if the source physical unit has a corresponding physical-to-logical mapping table, determining not to create the backup table.

9. A memory storage device, comprising:

a connection interface unit configured to be coupled to a host system;

a rewritable non-volatile memory module, wherein the rewritable non-volatile memory module comprises a plurality of physical units; and a memory control circuit unit coupled to the connection interface unit and the rewritable non-volatile memory module, wherein the memory control circuit unit is configured to perform a plurality of steps:

initiating a data merging operation;

selecting a source physical unit and a target physical unit from the rewritable non-volatile memory module to perform the data merging operation;

determining whether to create a backup table corresponding to a logical-to-physical mapping table, wherein the logical-to-physical mapping table comprises mapping relationships between a plurality of logical addresses and a plurality of physical addresses;

if it is determined that the backup table is created, copying first data located at a first physical address in the source physical unit to a second physical address in the target physical unit, and recording the second physical address in the backup table;

determining whether to update the second physical address to the logical-to-physical mapping table according to information in the backup table, wherein the logical-to-physical mapping table records a first logical address mapped to the first physical address; and if it is determined not to create the backup table, copying the first data located at the first physical address in the source physical unit to the second physical address in the target physical unit, and recording that the second physical address is mapped to the first logical address in a physical-to-logical mapping table, and after performing the data merging operation, updating the logical-to-physical mapping table according to the physical-to-logical mapping table such that the first logical address is mapped to the second physical address in the logical-to-physical mapping table.

10. The memory storage device according to claim 9, wherein the backup table also records the first physical address and a first logical address mapped to the first physical address, and the step of determining whether to update the second physical address to the logical-to-physical mapping table according to the information in the backup table comprises:

after performing the data merging operation, obtaining a third physical address mapped by the first logical address from the logical-to-physical mapping table; and determining whether to update the second physical address to the logical-to-physical mapping table according to a comparison result between the first physical address and the third physical address.

11. The memory storage device according to claim 10, wherein the step of determining whether to update the second physical address to the logical-to-physical mapping table according to the comparison result between the first physical address and the third physical address comprises:

if the third physical address is located in the source physical unit and the third physical address is greater than the first physical address, not updating the second physical address to the logical-to-physical mapping table.

12. The memory storage device according to claim 11, wherein the step of determining whether to update the second physical address to the logical-to-physical mapping table according to the comparison result between the first physical address and the third physical address further comprises:

if the third physical address is located in the source physical unit and the third physical address is less than or equal to the first physical address, updating the second physical address to the logical-to-physical mapping table such that the first logical address is mapped to the second physical address.

13. The memory storage device according to claim 12, wherein the steps further comprise:

if the third physical address is not located in the source physical unit, not updating the second physical address to the logical-to-physical mapping table.

14. The memory storage device according to claim 9, wherein the steps further comprise:

writing second data from the host system to a first physical unit among the physical units, wherein the step of determining whether to create the backup table corresponding to the logical-to-physical mapping table comprises:

if the source physical unit is the same as the first physical unit, determining to create the backup table; otherwise, not creating the backup table.

15. The memory storage device according to claim 9, wherein the step of determining whether to create the backup table corresponding to the logical-to-physical mapping table comprises:

if the source physical unit is an active physical unit or the source physical unit has not been closed, determining to create the backup table.

16. The memory storage device according to claim 9, wherein the step of determining whether to create the backup table corresponding to the logical-to-physical mapping table comprises:

if the source physical unit has a corresponding physical-to-logical mapping table, determining not to create the backup table.

17. A memory control circuit unit configured to control a rewritable non-volatile memory module, wherein the rewritable non-volatile memory module comprises a plurality of physical units, and the memory control circuit unit comprises:

a host interface configured to be coupled to a host system;

a memory interface configured to be coupled to the rewritable non-volatile memory module;

a memory management circuit coupled to the host interface and the memory interface, wherein the memory management circuit is configured to perform a plurality of steps:

initiating a data merging operation;

selecting a source physical unit and a target physical unit from the rewritable non-volatile memory module to perform the data merging operation;

determining whether to create a backup table corresponding to a logical-to-physical mapping table, wherein the logical-to-physical mapping table comprises mapping relationships between a plurality of logical addresses and a plurality of physical addresses;

if it is determined that the backup table is created, copying first data located at a first physical address in the source physical unit to a second physical address in the target physical unit, and recording the second physical address in the backup table;

determining whether to update the second physical address to the logical-to-physical mapping table according to information in the backup table, wherein the logical-to-physical mapping table records a first logical address mapped to the first physical address; and if it is determined not to create the backup table, copying the first data located at the first physical address in the source physical unit to the second physical address in the target physical unit, and recording that the second physical address is mapped to the first logical address in a physical-to-logical mapping table, and after performing the data merging operation, updating the logical-to-physical mapping table according to the physical-to-logical mapping table such that the first logical address is mapped to the second physical address in the logical-to-physical mapping table.

18. The memory control circuit unit according to claim 17, wherein the backup table also records the first physical address and a first logical address mapped to the first physical address, and the step of determining whether to update the second physical address to the logical-to-physical mapping table according to the information in the backup table comprises:

after performing the data merging operation, obtaining a third physical address mapped by the first logical address from the logical-to-physical mapping table; and determining whether to update the second physical address to the logical-to-physical mapping table according to a comparison result between the first physical address and the third physical address.

19. The memory control circuit unit according to claim 18, wherein the step of determining whether to update the second physical address to the logical-to-physical mapping table according to the comparison result between the first physical address and the third physical address comprises:

if the third physical address is located in the source physical unit and the third physical address is greater than the first physical address, not updating the second physical address to the logical-to-physical mapping table.

20. The memory control circuit unit according to claim 19, wherein the step of determining whether to update the second physical address to the logical-to-physical mapping table according to the comparison result between the first physical address and the third physical address further comprises:

if the third physical address is located in the source physical unit and the third physical address is less than or equal to the first physical address, updating the second physical address to the logical-to-physical mapping table such that the first logical address is mapped to the second physical address.

21. The memory control circuit unit according to claim 20, wherein the steps further comprise:

if the third physical address is not located in the source physical unit, not updating the second physical address to the logical-to-physical mapping table.

22. The memory control circuit unit according to claim 17, wherein the steps further comprise:

writing second data from the host system to a first physical unit among the physical units, wherein the step of determining whether to create the backup table corresponding to the logical-to-physical mapping table comprises:

if the source physical unit is the same as the first physical unit, determining to create the backup table; otherwise, not creating the backup table.

23. The memory control circuit unit according to claim 17, wherein the step of determining whether to create the backup table corresponding to the logical-to-physical mapping table comprises:

if the source physical unit is an active physical unit or the source physical unit has not been closed, determining to create the backup table.

24. The memory control circuit unit according to claim 17, wherein the step of determining whether to create the backup table corresponding to the logical-to-physical mapping table comprises:

if the source physical unit has a corresponding physical-to-logical mapping table, determining not to create the backup table.

* * * * *